(12) United States Patent
Jadhav et al.

(10) Patent No.: US 12,639,740 B2
(45) Date of Patent: May 26, 2026

(54) SYSTEMS AND METHODS FOR RETENTION BASED ITEM RECOMMENDATIONS

(71) Applicant: Walmart Apollo, LLC, Bentonville, AR (US)

(72) Inventors: Shreyas Saiprasad Jadhav, San Francisco, CA (US); Yue Xu, San Francisco, CA (US); Hyun Duk Cho, San Francisco, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 217 days.

(21) Appl. No.: 18/428,205

(22) Filed: Jan. 31, 2024

(65) Prior Publication Data

US 2025/0245721 A1      Jul. 31, 2025

(51) Int. Cl.
| | |
|---|---|
| *G06Q 30/00* | (2023.01) |
| *G06N 5/022* | (2023.01) |
| *G06Q 30/0601* | (2023.01) |

(52) U.S. Cl.
CPC ......... *G06Q 30/0631* (2013.01); *G06N 5/022* (2013.01); *G06Q 30/0641* (2013.01)

(58) Field of Classification Search
CPC ................................................ G06Q 30/0631
See application file for complete search history.

(56) References Cited

U.S. PATENT DOCUMENTS

| | | | |
|---|---|---|---|
| 7,653,594 B2 | 1/2010 | Davis | |
| 2008/0162269 A1 | 7/2008 | Gilbert | |

| | | | |
|---|---|---|---|
| 2011/0313835 A1 | 12/2011 | Falkenborg et al. | |
| 2022/0245703 A1* | 8/2022 | Chaganti ............ | G06Q 30/0623 |
| 2022/0261873 A1* | 8/2022 | Xu ............................ | G06N 5/04 |
| 2023/0206253 A1* | 6/2023 | Inan ................... | G06Q 30/0269 |
| | | | 705/7.29 |
| 2024/0428315 A1* | 12/2024 | Rao Karikurve .. | G06Q 30/0631 |
| 2025/0209489 A1* | 6/2025 | Majumdar ......... | G06Q 30/0222 |
| 2025/0245723 A1* | 7/2025 | Nag ................... | G06Q 30/0201 |

OTHER PUBLICATIONS

Jacobs, Bruno, Bas Donkers, and Dennis Fok. "Product Recommendations Based on Latent Purchase Motivations." Rotterdam, Neth.: ERIM (2014).*

* cited by examiner

*Primary Examiner* — Kathleen Palavecino
(74) *Attorney, Agent, or Firm* — Morgan, Lewis & Bockius LLP; Manita Rawat

(57)                    ABSTRACT

Systems and methods for providing item recommendations to increase retention rates of customers are disclosed. In some embodiments, a disclosed method includes: receiving, from a computing device, a recommendation request for recommending items to a customer; determining, based on the recommendation request, an anchor item to be displayed to the customer via a user interface; determining relevance scores between the anchor item and a plurality of candidate items; determining retention scores between the anchor item and the plurality of candidate items; generating, using at least one machine learning model, a ranked list of recommended items based on the plurality of candidate items, the relevance scores and the retention scores; and transmitting to the computing device the ranked list of recommended items to be displayed to the customer with the anchor item on the user interface.

16 Claims, 7 Drawing Sheets

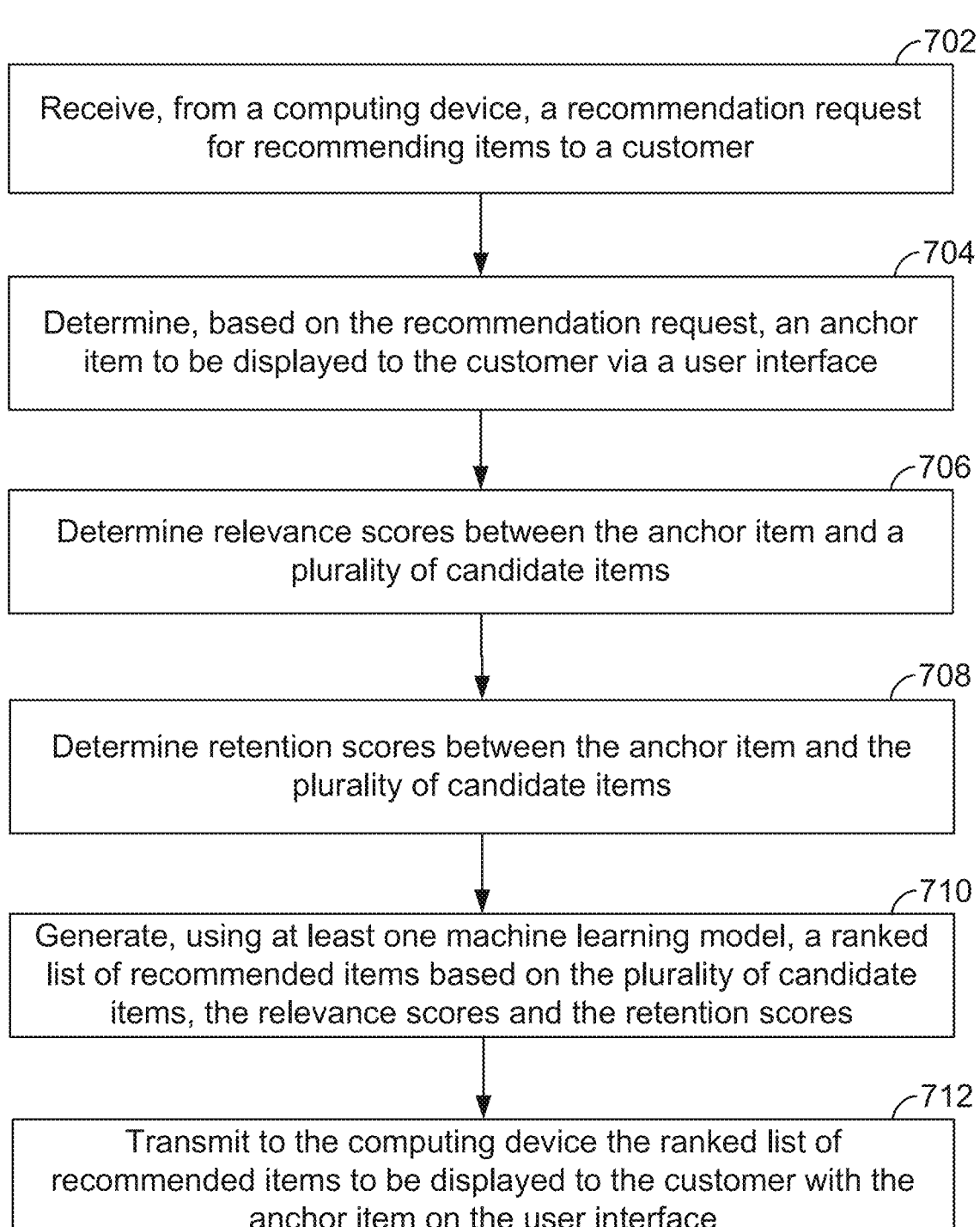

700

702

Receive, from a computing device, a recommendation request for recommending items to a customer

704

Determine, based on the recommendation request, an anchor item to be displayed to the customer via a user interface

706

Determine relevance scores between the anchor item and a plurality of candidate items

708

Determine retention scores between the anchor item and the plurality of candidate items

710

Generate, using at least one machine learning model, a ranked list of recommended items based on the plurality of candidate items, the relevance scores and the retention scores

712

Transmit to the computing device the ranked list of recommended items to be displayed to the customer with the anchor item on the user interface

FIG. 7

SYSTEMS AND METHODS FOR RETENTION BASED ITEM RECOMMENDATIONS

TECHNICAL FIELD

This application relates generally to item recommendations and, more particularly, to systems and methods for providing item recommendations to increase retention rates of customers.

BACKGROUND

Online e-commerce platforms are attracting new customers at a high rate. But from time to time, some customers become inactive or churn out. A big percentage of churned customers includes new customers who have never made any transaction on an e-commerce platform, and reactivated customers who have stopped making any transaction on the e-commerce platform for a past time period, e.g. the past year. The retailers are seeking methods to improve customer retention and make these customers come back to continue to place orders.

Item recommendation tasks in e-commerce industry are essential to improve user experiences by recommending items to users. Conventional recommendation systems provide information about matches between users (e.g., shopping customers) and items (e.g., books, electronics, grocery) based on user interests, user preferences, or historical interactions. Existing recommendation systems do not consider customer retention rates. As such, it is challenging yet desirable to provide item recommendations to increase retention rates of customers.

SUMMARY

The embodiments described herein are directed to systems and methods for providing item recommendations to increase retention rates of customers.

In various embodiments, a system including a non-transitory memory configured to store instructions thereon and at least one processor is disclosed. The at least one processor is operatively coupled to the non-transitory memory and configured to read the instructions to: receive, from a computing device, a recommendation request for recommending items to a customer; determine, based on the recommendation request, an anchor item to be displayed to the customer via a user interface; determine relevance scores between the anchor item and a plurality of candidate items; determine retention scores between the anchor item and the plurality of candidate items; generate, using at least one machine learning model, a ranked list of recommended items based on the plurality of candidate items, the relevance scores and the retention scores; and transmit to the computing device the ranked list of recommended items to be displayed to the customer with the anchor item on the user interface.

In various embodiments, a computer-implemented method is disclosed. The computer-implemented method includes: receiving, from a computing device, a recommendation request for recommending items to a customer; determining, based on the recommendation request, an anchor item to be displayed to the customer via a user interface; determining relevance scores between the anchor item and a plurality of candidate items; determining retention scores between the anchor item and the plurality of candidate items; generating, using at least one machine learning model, a ranked list of recommended items based on the plurality of candidate items, the relevance scores and the retention scores; and transmitting to the computing device the ranked list of recommended items to be displayed to the customer with the anchor item on the user interface.

In various embodiments, a non-transitory computer readable medium having instructions stored thereon is disclosed. The instructions, when executed by at least one processor, cause at least one device to perform operations including: receiving, from a computing device, a recommendation request for recommending items to a customer; determining, based on the recommendation request, an anchor item to be displayed to the customer via a user interface; determining relevance scores between the anchor item and a plurality of candidate items; determining retention scores between the anchor item and the plurality of candidate items; generating, using at least one machine learning model, a ranked list of recommended items based on the plurality of candidate items, the relevance scores and the retention scores; and transmitting to the computing device the ranked list of recommended items to be displayed to the customer with the anchor item on the user interface.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIG. 7 is a flowchart illustrating an exemplary method for providing item recommendations to increase retention rates of customers, in accordance with some embodiments of the present teaching.

DETAILED DESCRIPTION

Figure 1:
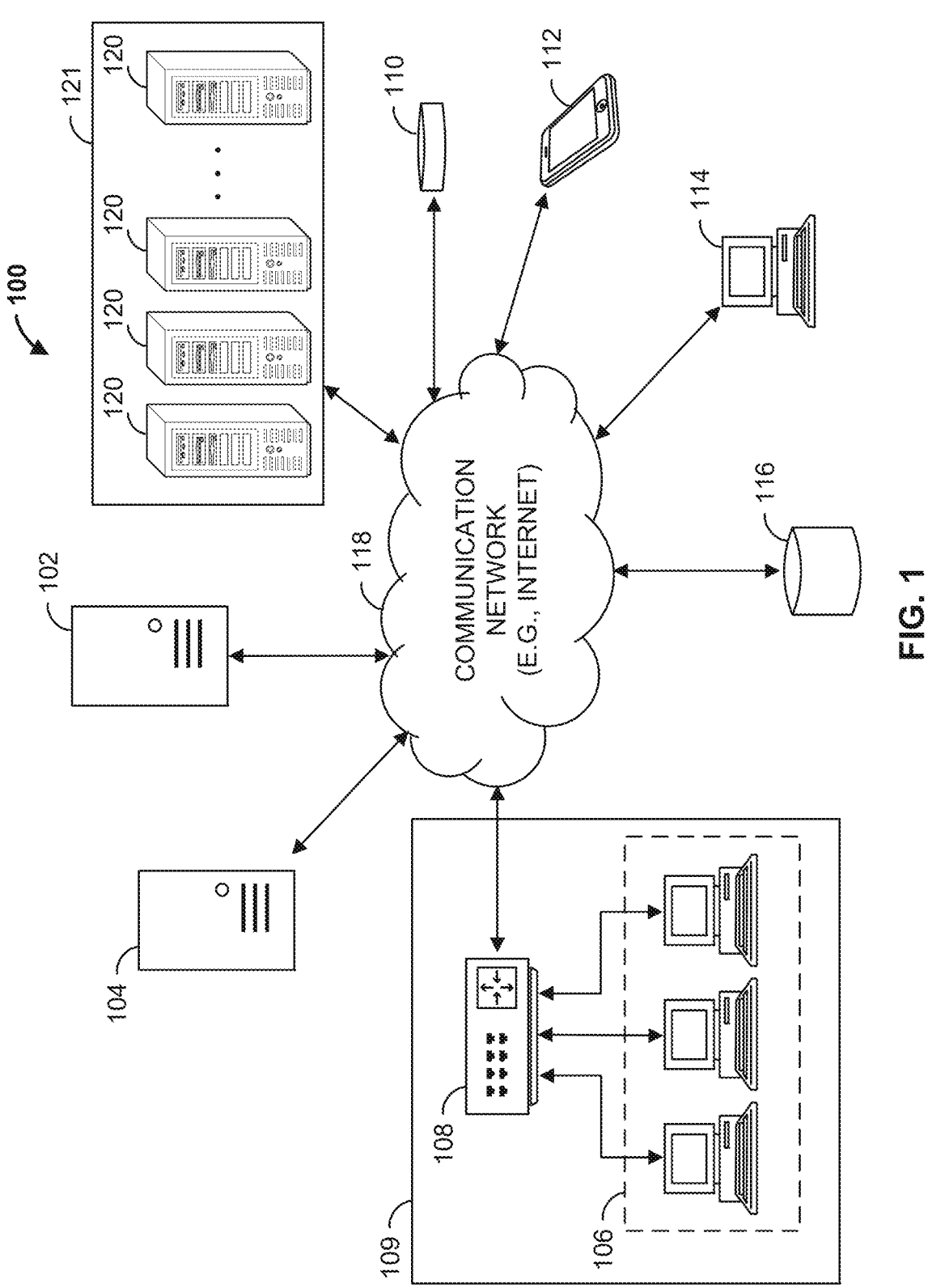
FIG. 1 is a network environment configured for providing item recommendations to increase retention rates of customers, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

It is important for a retailer to activate new and reactivated customers, because they often form a big share of the customer base of the retailer, as well as the largest source of customer churn. One objective of the present teaching is to improve customer retention through engagement with these customers. In some embodiments, a system can identify and solve shopping behaviors of these customers to bring them along a path of activation and engagement. For example, the system can model behaviors of new and reactivated customers who performed one and done shopping based on behaviors of repeat customers who performed repeat transactions. Some observed organic repeat transaction patterns can be applied across a larger set of new and reactivated customers.

In some embodiments, the system can identify both in-session and historical indications that points to likelihood of customers churning out. By focusing on the new and reactivated customers who have the largest likelihood of churning out, the system aims at activating or nudging these customers to make their second transactions within a predetermined time period (e.g. 4 weeks, 8 weeks or 12 weeks) after their first transactions. For example, the activations may be based on building baskets that are correlated with strong repeat behavior during their first transactions.

In some embodiments, the system generates retention scores for each product type based on a correlation between orders placed under the product type and customers' retention patterns afterwards. Each retention score represents a retention probability that a customer will purchase an item in a second product type within a certain time period after purchasing an item in a first product type. In some examples, in order to increase customer retention rate, the system can generate a personalized ranked list of recommended items to a new or reactivated customer by leveraging the retention scores associated with each recommended item.

In some embodiments, the system models patterns of customer retention explicitly as a statistical score, retention score, for each product type. The retention score is input into a personalized recommendation model with the objective to improve retention rate in future. This enables the system to have real time inferencing capability that optimizes for retention rate for a given cohort of customers.

Furthermore, in the following, various embodiments are described with respect to systems and methods for providing item recommendations to increase retention rates of customers are disclosed. In some embodiments, a disclosed method includes: receiving, from a computing device, a recommendation request for recommending items to a customer; determining, based on the recommendation request, an anchor item to be displayed to the customer via a user interface; determining relevance scores between the anchor item and a plurality of candidate items; determining retention scores between the anchor item and the plurality of candidate items; generating, using at least one machine learning model, a ranked list of recommended items based on the plurality of candidate items, the relevance scores and the retention scores; and transmitting to the computing device the ranked list of recommended items to be displayed to the customer with the anchor item on the user interface.

Turning to the drawings, FIG. 1 is a network environment 100 configured for providing item recommendations to increase retention rates of customers, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, an item recommendation computing device 102, a server 104 (e.g., a web server or an application server), a cloud-based engine 121 including one or more processing devices 120, workstation(s) 106, a database 116, and one or more user computing devices 110, 112, 114 operatively coupled over the network 118. The item recommendation computing device 102, the server 104, the workstation(s) 106, the processing device(s) 120, and the multiple user computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the item recommendation computing device 102 and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the item recommendation computing device 102.

In some examples, each of the multiple user computing devices 110, 112, 114 can be a cellular phone, a smart phone, a tablet, a personal assistant device, a voice assistant device, a digital assistant, a laptop, a computer, a laser-based code scanner, or any other suitable device. In some examples, the server 104 hosts one or more websites or apps providing one or more products or services. In some examples, the item recommendation computing device 102, the processing devices 120, and/or the server 104 are operated by a retailer, and the multiple user computing devices 110, 112, 114 are operated by customers, associates and/or managers of the retailer. In some examples, the processing devices 120 are operated by a third party (e.g., a cloud-computing provider).

The workstation(s) 106 are operably coupled to the communication network 118 via a router (or switch) 108. The workstation(s) 106 and/or the router 108 may be located at a store 109 of a retailer, for example. The workstation(s) 106 can communicate with the item recommendation computing device 102 over the communication network 118. The workstation(s) 106 may send data to, and receive data from, the item recommendation computing device 102. For example, the workstation(s) 106 may transmit data identifying items purchased by a customer at the store 109 to the item recommendation computing device 102. The workstation(s) 106 may also transmit other data related to the store 109 to the item recommendation computing device 102.

Although FIG. 1 illustrates three user computing devices 110, 112, 114, the network environment 100 can include any number of user computing devices 110, 112, 114. Similarly, the network environment 100 can include any number of the item recommendation computing devices 102, the processing devices 120, the workstations 106, the servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

In some embodiments, each of the first user computing device 110, the second user computing device 112, and the Nth user computing device 114 may communicate with the server 104 over the communication network 118. For example, each of the multiple user computing devices 110, 112, 114 may be operable to view, access, and interact with a website, such as a retailer's website, hosted by the server 104. The server 104 may capture user session data related to a customer's activity (e.g., interactions) on the website.

In some examples, a customer may operate one of the user computing devices 110, 112, 114 to initiate a web browser that is directed to the website hosted by the server 104. The customer may, via the web browser, view item advertisements for items displayed on the website, and may click on item advertisements, for example. The website may capture these activities as user session data, and transmit the user session data to the item recommendation computing device 102 over the communication network 118. The website may also allow the customer to add one or more of the items to an online shopping cart, and allow the customer to perform a "checkout" of the shopping cart to purchase the items. In some examples, the server 104 transmits purchase data identifying items the customer has purchased from the website to the item recommendation computing device 102.

In some examples, a customer may go to a store, e.g. the store 109 for purchasing items. The customer may use some payment method, e.g. a credit card or a payment app, at the store 109 to purchase one or more items. The workstation(s) 106 in the store 109 may capture these activities as in-store purchase data, and transmit the in-store purchase data to the item recommendation computing device 102 over the communication network 118, together with other store related data.

In some examples, the item recommendation computing device 102 may receive a recommendation request for recommending items to a customer of a retailer from the server 104. The recommendation request may be sent standalone or together with data associated with the customer's interaction with a website of the retailer, e.g. an anchor item to be displayed to the customer via the website or a user interface. In response, the item recommendation computing device 102 generates a ranked list of recommended items based on a plurality of candidate items, relevance scores between the anchor item and a plurality of candidate items, and retention scores between the anchor item and the plurality of candidate items.

In some examples, the item recommendation computing device 102 may execute one or more models (e.g., programs or algorithms), such as a machine learning model, deep learning model, statistical model, etc., to generate a ranked list of recommended items to advertise to the customer (i.e., item recommendations). The item recommendation computing device 102 may generate and transmit the item recommendations to the server 104 over the communication network 118, and the server 104 may display one or more of the recommended items on the website to the customer. For example, the server 104 may display the recommended items to the customer on a homepage, a cart page, a catalog webpage, an item webpage, a search results webpage, or a post-transaction webpage (e.g. a thank you page) of the website (e.g., as the customer browses those respective webpages).

In one example, a customer selects an item on a website hosted by the server 104, e.g. by clicking on the item to view its product description details, by adding it to shopping cart, or by purchasing it. The server 104 may treat the item as an anchor item or query item for the customer, and send a recommendation request to the item recommendation computing device 102. In response to receiving the request, the item recommendation computing device 102 may execute the one or more processors to determine recommended items that are related to the anchor item and can potentially increase the likelihood of the customer's retention, and transmit the recommended items to the server 104 to be displayed together with the anchor item to the customer.

In another example, a customer submits a search query on a website hosted by the server 104, e.g. by entering a query in a search bar. The server 104 may send a recommendation request to the item recommendation computing device 102. In response to receiving the request, the item recommendation computing device 102 may execute the one or more processors to first determine search results including items matching the search query, and then determine recommended items that are related to one or more top items in the search results and can potentially increase the likelihood of the customer's retention. The item recommendation computing device 102 may transmit the recommended items to the server 104 to be displayed together with the search results to the customer.

In some embodiments, the item recommendation computing device 102 is further operable to communicate with the database 116 over the communication network 118. For example, the item recommendation computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the item recommendation computing device 102, in some examples, the database 116 can be a local storage device, such as a hard drive, a non-volatile memory, or a USB stick. The item recommendation computing device 102 may store online purchase data received from the server 104 in the database 116. The item recommendation computing device 102 may receive in-store purchase data and store related data from the store 109 and store them in the database 116. The item recommendation computing device 102 may also receive from the server 104 user session data identifying events associated with browsing sessions, and may store the user session data in the database 116. The item recommendation computing device 102 may also compute recommendation data related to a ranked list of recommended items, and may store the recommendation data in the database 116.

In some examples, the item recommendation computing device 102 generates and/or updates different models (e.g., machine learning models, deep learning models, statistical models, algorithms, etc.) for providing item recommendations to increase retention rates of customers. The item recommendation computing device 102 may generate training data for the models based on historical user session data, purchase data, and interaction based labels. The item recommendation computing device 102 trains the models based on their corresponding training data, and stores the models in a database, such as in the database 116 (e.g., a cloud storage). The models, when executed by the item recommendation computing device 102, allow the item recommendation computing device 102 to determine item recommendations for one or more items to advertise to a customer.

In some examples, the item recommendation computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, the item recommendation computing device 102 may generate ranked item recommendations for items to be displayed on the website.

Figure 2:
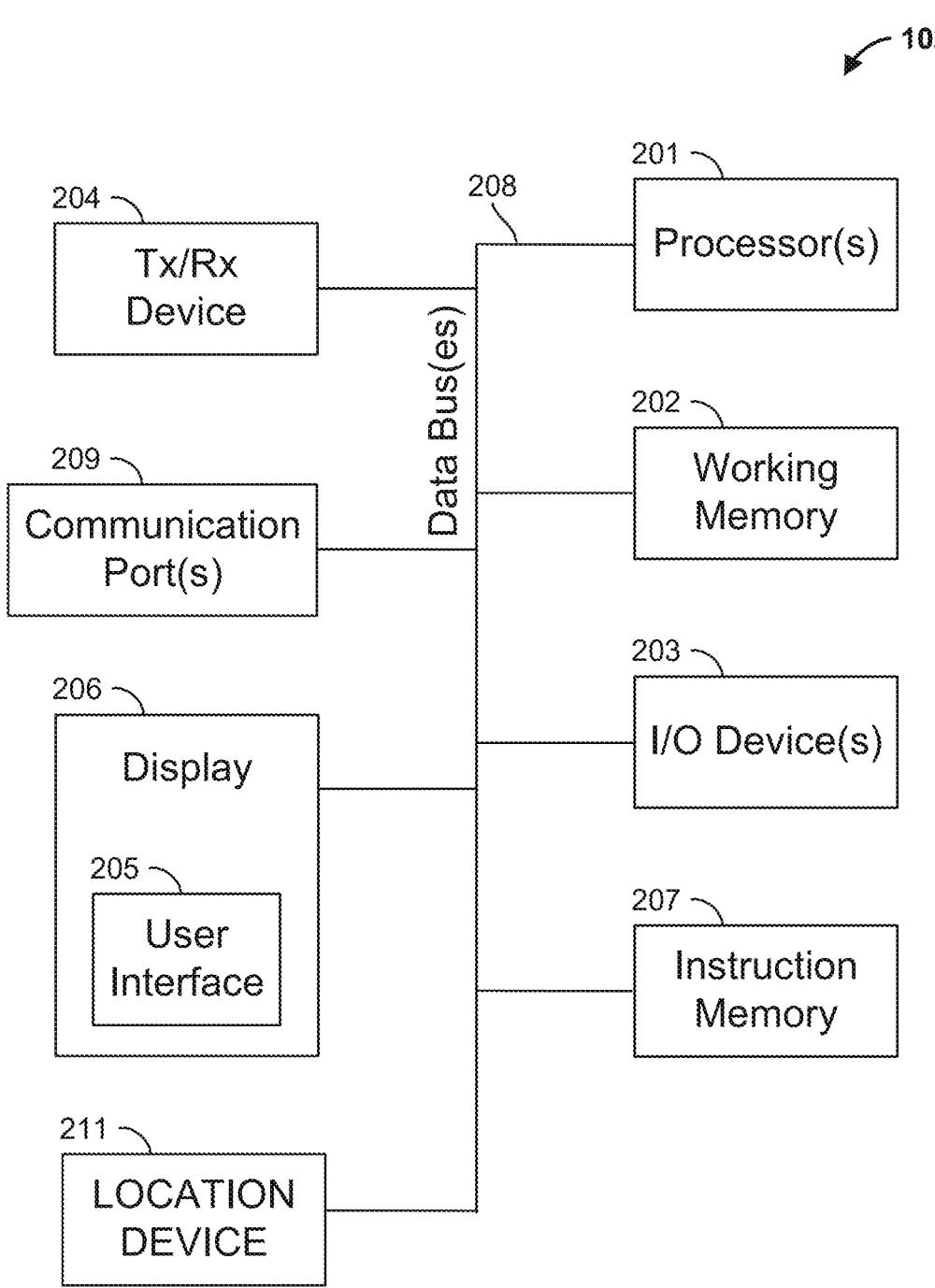
FIG. 2 is a block diagram of an item recommendation computing device, in accordance with some embodiments of the present teaching.

FIG. 2 illustrates a block diagram of an item recommendation computing device, e.g. the item recommendation computing device 102 of FIG. 1, in accordance with some embodiments of the present teaching. In some embodiments, each of the item recommendation computing device 102, the server 104, the workstation(s) 106, the multiple user computing devices 110, 112, 114, and the one or more processing devices 120 in FIG. 1 may include the features shown in FIG. 2. Although FIG. 2 is described with respect to certain components shown therein, it will be appreciated that the elements of the item recommendation computing device 102 can be combined, omitted, and/or replicated. In addition, it will be appreciated that additional elements other than those illustrated in FIG. 2 can be added to the item recommendation computing device 102.

As shown in FIG. 2, the item recommendation computing device 102 can include one or more processors 201, an instruction memory 207, a working memory 202, one or more input/output devices 203, one or more communication ports 209, a transceiver 204, a display 206 with a user interface 205, and an optional location device 211, all operatively coupled to one or more data buses 208. The data buses 208 allow for communication among the various components. The data buses 208 can include wired, or wireless, communication channels.

The one or more processors 201 can include any processing circuitry operable to control operations of the item recommendation computing device 102. In some embodiments, the one or more processors 201 include one or more distinct processors, each having one or more cores (e.g., processing circuits). Each of the distinct processors can have the same or different structure. The one or more processors 201 can include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 201 may also be implemented by a controller, a microcontroller, an application specific integrated circuit (ASIC), a field programmable gate array (FPGA), a programmable logic device (PLD), etc.

In some embodiments, the one or more processors 201 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 207 can store instructions that can be accessed (e.g., read) and executed by at least one of the one or more processors 201. For example, the instruction memory 207 can be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 201 can be configured to perform a certain function or operation by executing code, stored on the instruction memory 207, embodying the function or operation. For example, the one or more processors 201 can be configured to execute code stored in the instruction memory 207 to perform one or more of any function, method, or operation disclosed herein.

Additionally, the one or more processors 201 can store data to, and read data from, the working memory 202. For example, the one or more processors 201 can store a working set of instructions to the working memory 202, such as instructions loaded from the instruction memory 207. The one or more processors 201 can also use the working memory 202 to store dynamic data created during one or more operations. The working memory 202 can include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 207 and working memory 202, it will be appreciated that the item recommendation computing device 102 can include a single memory unit configured to operate as both instruction memory and working memory. Further, although embodiments are discussed herein including non-volatile memory, it will be appreciated that the item recommendation computing device 102 can include volatile memory components in addition to at least one non-volatile memory component.

In some embodiments, the instruction memory 207 and/or the working memory 202 includes an instruction set, in the form of a file for executing various methods, e.g. any method as described herein. The instruction set can be stored in any acceptable form of machine-readable instructions, including source code or various appropriate programming languages. Some examples of programming languages that can be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 201.

The input-output devices 203 can include any suitable device that allows for data input or output. For example, the input-output devices 203 can include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 204 and/or the communication port(s) 209 allow for communication with a network, such as the communication network 118 of FIG. 1. For example, if the communication network 118 of FIG. 1 is a cellular network, the transceiver 204 is configured to allow communications with the cellular network. In some embodiments, the transceiver 204 is selected based on the type of the communication network 118 the item recommendation computing device 102 will be operating in. The one or more processors 201 are operable to receive data from, or send data to, a network, such as the communication network 118 of FIG. 1, via the transceiver 204.

The communication port(s) 209 may include any suitable hardware, software, and/or combination of hardware and software that is capable of coupling the item recommendation computing device 102 to one or more networks and/or additional devices. The communication port(s) 209 can be arranged to operate with any suitable technique for controlling information signals using a desired set of communications protocols, services, or operating procedures. The communication port(s) 209 can include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 209 allows for the programming of executable instructions in the instruction memory 207. In some embodiments, the communication port(s) 209 allow for the transfer (e.g., uploading or downloading) of data, such as machine learning model training data.

In some embodiments, the communication port(s) 209 are configured to couple the item recommendation computing device 102 to a network. The network can include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments can include in-body communications, various devices, and various modes of communications such as wireless communications, wired communications, and combinations of the same.

In some embodiments, the transceiver 204 and/or the communication port(s) 209 are configured to utilize one or more communication protocols. Examples of wired protocols can include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols can include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 206 can be any suitable display, and may display the user interface 205. For example, the user interfaces 205 can enable user interaction with the item recommendation computing device 102 and/or the server 104. For example, the user interface 205 can be a user interface for an application of a network environment operator that allows a customer to view and interact with the operator's website. In some embodiments, a user can interact with the user interface 205 by engaging the input-output devices 203. In some embodiments, the display 206 can be a touchscreen, where the user interface 205 is displayed on the touchscreen.

The display 206 can include a screen such as, for example, a Liquid Crystal Display (LCD) screen, a light-emitting diode (LED) screen, an organic LED (OLED) screen, a movable display, a projection, etc. In some embodiments, the display 206 can include a coder/decoder, also known as Codecs, to convert digital media data into analog signals. For example, the visual peripheral output device can include video Codecs, audio Codecs, or any other suitable type of Codec.

The optional location device 211 may be communicatively coupled to a location network and operable to receive position data from the location network. For example, in some embodiments, the location device 211 includes a GPS device configured to receive position data identifying a latitude and longitude from one or more satellites of a GPS constellation. As another example, in some embodiments, the location device 211 is a cellular device configured to receive location data from one or more localized cellular towers. Based on the position data, the item recommendation computing device 102 may determine a local geographical area (e.g., town, city, state, etc.) of its position.

In some embodiments, the item recommendation computing device 102 is configured to implement one or more modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/ output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/ engine that performs those multiple functions, possibly alongside other functions, or distributed differently among a set of modules/engines than specifically illustrated in the embodiments herein.

Figure 3:
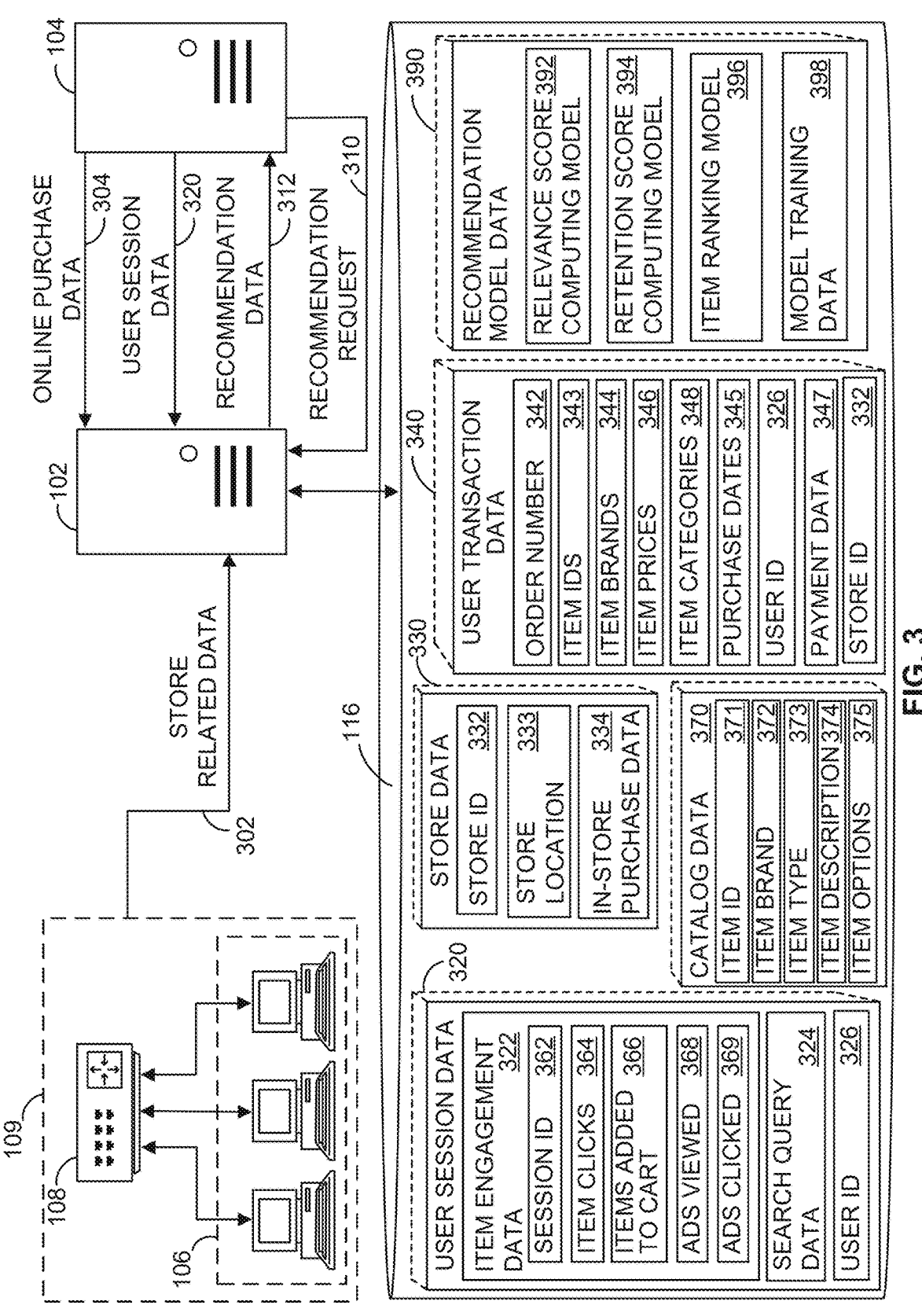
FIG. 3 is a block diagram illustrating various portions of a system for providing item recommendations to increase retention rates of customers, in accordance with some embodiments of the present teaching.

FIG. 3 is a block diagram illustrating various portions of a system for providing item recommendations to increase retention rates of customers, e.g. the system shown in the network environment 100 of FIG. 1, in accordance with some embodiments of the present teaching. As indicated in FIG. 3, the item recommendation computing device 102 may receive user session data 320 from the server 104, and store the user session data 320 in the database 116. The user session data 320 may identify, for each user (e.g., customer), data related to that user's browsing session, such as when browsing a retailer's webpage hosted by the server 104.

In some examples, the user session data 320 may include item engagement data 322, search query data 324, and user ID 326 (e.g., a customer ID, retailer website login ID, a cookie ID, etc.). The item engagement data 322 may include one or more of a session ID 362 (i.e., a website browsing session identifier), item clicks 364 identifying items which a user clicked (e.g., images of items for purchase, keywords to filter reviews for an item), items added-to-cart 366 identifying items added to the user's online shopping cart, advertisements viewed 368 identifying advertisements the user viewed during the browsing session, advertisements clicked 369 identifying advertisements the user clicked on. The search query data 324 may identify one or more searches conducted by a user during a browsing session (e.g., a current browsing session).

The item recommendation computing device 102 may also receive online purchase data 304 from the server 104, which identifies and characterizes one or more online purchases, such as purchases made by the user and other users via a retailer's website hosted by the server 104. The item recommendation computing device 102 may also receive store related data 302 from the store 109, which identifies and characterizes one or more in-store purchases. In some embodiments, the store related data 302 may also indicate other information about the store 109.

The item recommendation computing device 102 may parse the store related data 302 and the online purchase data 304 to generate user transaction data 340. In this example, the user transaction data 340 may include, for each purchase, one or more of: an order number 342 identifying a purchase order, item IDs 343 identifying one or more items purchased in the purchase order, item brands 344 identifying a brand for each item purchased, item prices 346 identifying the price of each item purchased, item categories 348 identifying a product type (or category) of each item purchased, purchase dates 345 identifying the purchase dates of the purchase orders, a user ID 326 for the user making the corresponding purchase, payment data 347 indicating payment methods and related information (e.g. emails associated with payment) for corresponding online orders, and store ID 332 for the corresponding in-store purchase, or for the pickup store or shipping-from store associated with the corresponding online purchase.

In some embodiments, the database 116 may parse the store related data 302 to generate store data 330. In this example, the store data 330 may include, for each store, one or more of: a store ID 332 of the store, a store location 333 of the store, and in-store purchase data 334 of the store.

In some embodiments, the database 116 may further store catalog data 370, which may identify one or more attributes of a plurality of items, such as a portion of or all items a retailer carries in stores and/or at e-commerce platforms. The catalog data 370 may identify, for each of the plurality of items, an item ID 371 (e.g., an SKU number), item brand 372, item type 373 (e.g., grocery item such as milk, clothing item), item description 374 (e.g., a description of the product including product features, such as ingredients, benefits, use or consumption instructions, or any other suitable description), and item options 375 (e.g., item colors, sizes, flavors, etc.).

The database 116 may also store recommendation model data 390 identifying and characterizing one or more models and related data for providing item recommendations. For example, the recommendation model data 390 may include: a relevance score computing model 392, a retention score computing model 394, an item ranking model 396, and model training data 398.

The relevance score computing model 392 may be used to compute a relevance score between an anchor item and a candidate recommendation item. In some embodiments, the relevance score computing model 392 includes a similarity model configured to compute a similarity score between the anchor item and the candidate item. In some embodiments, the relevance score computing model 392 includes a complementary model configured to compute a complementary score between the anchor item and the candidate item. In some embodiments, the relevance score is computed based on: the similarity score, the complementary score, or a combination of both.

The retention score computing model 394 may be used to compute a retention score between an anchor item and a candidate recommendation item. In some embodiments, the retention score indicates a probability that a customer will purchase the candidate item within a future time period. In some examples, the retention score is computed based on: determining a first product type of the anchor item; determining a second product type of the candidate item; computing, based on a Bayesian statistical model, a retention probability that the customer will purchase an item in the second product type within a certain time period after purchasing an item in the first product type; and computing the retention score based on the retention probability.

The item ranking model 396 may be used to rank recommended items based on the relevance scores and the retention scores, which are calculated based on the relevance score computing model 392 and the retention score computing model 394, respectively. In some examples, the item ranking model 396 include a pairwise learn to rank model used to generate a ranked list of recommended items for an anchor item, based on: ranking a plurality of candidate items based on their respective relevance scores regarding the anchor item to generate a ranked list of relevant items; re-ranking, using at least one machine learning model, the ranked list of relevant items to generate a re-ranked list of relevant items, based on a weighted combination of the relevance scores and the retention scores with corresponding weights predetermined during a training stage of the at least one machine learning model; and selecting a plurality of top items in the re-ranked list of relevant items to generate the ranked list of recommended items.

The model training data 398 may include training data utilized for training one or more of the relevance score computing model 392, the retention score computing model 394 and the item ranking model 396. In some examples, the model training data 398 may include, but not limited to, data related to a plurality of item pairs each including an anchor sample and a recommendation sample and associated with a label score. The label score may be determined based on historical interaction data of a plurality of customers regarding the recommendation sample. The model training data 398 may be used to train a machine learning model is optimize an objective function based on optimized hyperparameters. In some examples, the optimized hyperparameters include a first weight for the relevance scores and a second weight for the retention scores. In some examples, the objective function is computed based on a plurality of ranking differences each being a difference between a first ranking and a second ranking for a respective anchor sample. Each of the first ranking and the second ranking is a ranking of the recommendation samples paired to the respective anchor sample. The first ranking of the recommendation samples is determined based on the machine learning model being trained. The second ranking of the recommendation samples is determined based on their respective label scores.

In some examples, the label score for each respective item pair is determined based on a combination of interaction scores representing different types of interactions of the plurality of customers regarding a corresponding recommendation sample in the respective item pair. The interaction scores include at least: a first interaction score representing an add-to-cart operation of a first customer regarding the corresponding recommendation sample, a second interaction score representing a click operation of a second customer regarding the corresponding recommendation sample, and a third interaction score representing an impression operation of a third customer regarding the corresponding recommendation sample. The first interaction score is larger than the second interaction score. The second interaction score is larger than the third interaction score. For example, the first interaction score, the second interaction score and the third interaction score may be 2, 1, 0, respectively. In some examples, the interaction scores also include a fourth interaction score representing a purchase of the corresponding recommendation sample by a fourth customer. In some examples, the fourth interaction score is larger than the other three interaction scores. The first, second, third and fourth customers may or may be the same as each other.

In some examples, the item recommendation computing device 102 receives a recommendation request 310 from the server 104. The recommendation request 310 may be associated with an anchor item or query item to be displayed to a user, e.g. after the user chooses the anchor item from a search results webpage, or after the user clicks on an advertisement or promotion related to the anchor item. In some embodiments, the item recommendation computing device 102 may determine relevance scores between the anchor item and a plurality of candidate items, and determine retention scores between the anchor item and the plurality of candidate items. Based on the plurality of candidate items, the relevance scores and the retention scores, the item recommendation computing device 102 may generate, using at least one machine learning model, recommendation data 312 indicating a ranked list of recommended items. The at least one machine learning model may include any model in the recommendation model data 390. In response to the recommendation request 310, the item recommendation computing device 102 transmits the recommendation data 312 to the server 104.

In some embodiments, the item recommendation computing device 102 may assign one or more of the above described operations to a different processing unit or virtual machine hosted by one or more processing devices 120. Further, the item recommendation computing device 102 may obtain the outputs of the these assigned operations from the processing units, and generate the ranked item recommendations based on the outputs.

Figure 4:
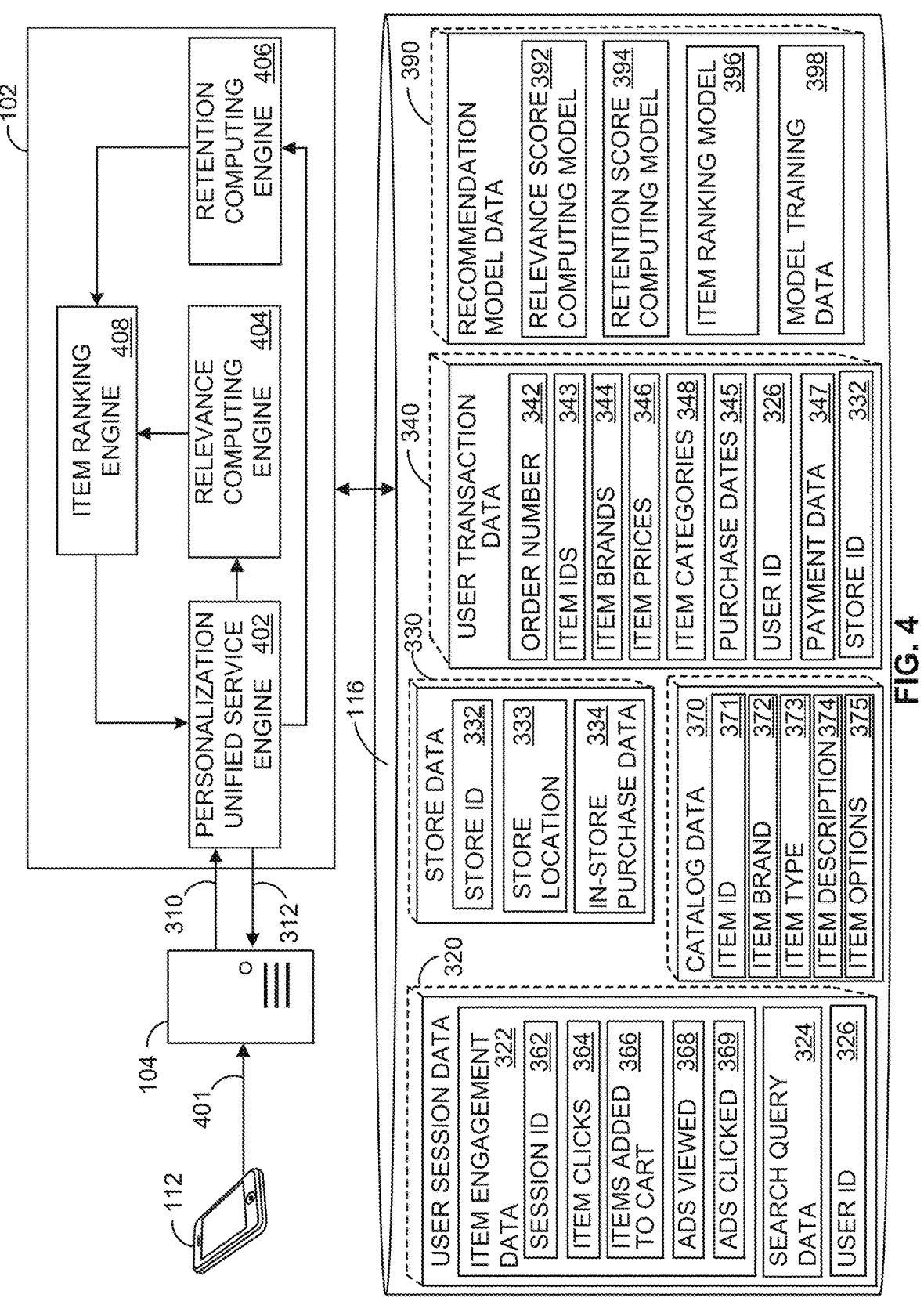
FIG. 4 is a block diagram illustrating various portions of an item recommendation computing device, in accordance with some embodiments of the present teaching.

FIG. 4 is a block diagram illustrating a more detailed view of an item recommendation computing device, e.g. the item recommendation computing device 102 in FIG. 1, in accordance with some embodiments of the present teaching. As shown in FIG. 4, the item recommendation computing device 102 includes a personalization unified service engine 402, a relevance computing engine 404, a retention computing engine 406, and an item ranking engine 408. In some examples, one or more of the personalization unified service engine 402, the relevance computing engine 404, the retention computing engine 406 and the item ranking engine 408 are implemented in hardware. In some examples, one or more of the personalization unified service engine 402, the relevance computing engine 404, the retention computing engine 406 and the item ranking engine 408 are implemented as an executable program maintained in a tangible, non-transitory memory, such as instruction memory 207 of FIG. 2, which may be executed by one or processors, such as processor 201 of FIG. 2.

For example, the personalization unified service engine 402 may obtain from the server 104 a recommendation request 310 as a message 401 is sent from the user device 112 to the server 104, and may execute recommendation model(s) included in the recommendation model data 390. The message 401 sent by the user using the user device 112 may indicate a search query or an anchor item chosen by the user. The recommendation request 310 may either include information about the anchor item, or indicate the anchor item in the user session data 320. In some embodiments, the recommendation request 310 is to seek one or more recommended items that are related to the anchor item and can increase retention likelihood of the user or customer. When the recommendation request 310 indicates a search query, the item recommendation computing device 102 may treat one or more top items matching the search query as the anchor item for the retention based item recommendation.

In this example, the server 104 transmits a recommendation request 310 to the item recommendation computing device 102. The recommendation request 310 may include a request for item recommendations for presentation to a particular user using the user device 112. In some examples, recommendation request 310 further identifies a user (e.g., customer) for whom the item recommendations are requested at the server 104. The personalization unified service engine 402 receives the recommendation request 310, and receives and parses the user session data 320 (e.g., user session data associated with a current user session of the user in real-time). The personalization unified service engine 402 provides to the relevance computing engine 404 and the retention computing engine 406, the user session data 320 and other data, which may include information about the anchor item, the user transaction data 340, and user session data 320 (e.g., user session data from historical user sessions) extracted from the database 116.

In some embodiments, the relevance computing engine 404 can obtain the relevance score computing model 392 from the database 116, where the relevance score computing model 392 includes one or more models for computing relevance scores between the anchor item and a plurality of candidate items. In some embodiments, the plurality of candidate items may be determined based on: the anchor item, popular items at a current shopping season, the customer's historical session data and transaction data, etc. In some embodiments, the plurality of candidate items are determined by the personalization unified service engine 402 and sent to the relevance computing engine 404 and the retention computing engine 406.

In some embodiments, for each candidate item of the plurality of candidate items, the relevance computing engine 404 computes a similarity score between the anchor item and the candidate item, compute a complementary score between the anchor item and the candidate item, and compute a relevance score between the anchor item and the candidate item based on: the similarity score, the complementary score, or a combination of both. The similarity score can indicate a degree of similarity between the anchor item and the candidate item. For example, cell phones that are different models of a same brand may be treated as similar items to each other. The complementary score can indicate a degree of complementarity between the anchor item and the candidate item. A complementary item is a type of items whose popularity increases with the popularity of its complement. Therefore, complementary items usually have higher chances to be purchased together to complete the same shopping goal. For example, shampoo and conditioner are complementary to each other in order to fulfill the needs of shower supplies; TV and TV Mount are also complementary items for TV entertainment purposes.

In some embodiments, the retention computing engine 406 can obtain data related to the recommendation request (including data about the anchor item, the customer and the plurality of candidate items) from the personalization unified service engine 402, the relevance computing engine 404 and/or the database 116. In some embodiments, the retention computing engine 406 obtains the retention score computing model 394 from the database 116, where the retention score computing model 394 includes one or more models for computing retention scores between the anchor item and the plurality of candidate items.

In some embodiments, for each candidate item of the plurality of candidate items, the retention computing engine 406 computes a retention score indicating a probability that the customer will purchase the candidate item within a future time period. In some embodiments, computing the retention score comprises: determining a first product type of the anchor item; determining a second product type of the candidate item; computing a retention probability that the customer will purchase an item in the second product type within a certain time period after purchasing an item in the first product type; and computing the retention score based on the retention probability. The retention probability is a transition probability from one product type to another product type.

In some embodiments, the retention probability is computed based on a model that considers all customers that have had at least two transactions in a certain time period, e.g. eight weeks. All of those transactions are used to find a pattern of product types moving from a first transaction to a second transaction, including e.g. what are the product types that are usually transacted in the second transaction, given a product type in the first transaction, how many customers performed that switching between product types. When one transaction or one order includes multiple product types, each product type is considered for determine the product type transition patterns and repeat frequency for each product type transition. This determination is performed across multiple customers, to take into account of: the number of customers performing a transition between the two transactions with respect to two product types (which may or may not be the same as each other) and the number of items that have been transacted between the two product types.

In some embodiments, the retention probability is computed based on a Bayesian statistical model, which may be part of the retention score computing model 394. In some embodiments, computing the retention probability comprises: determining a first number of customers who purchased items in the first product type; determining, among the first number of customers, a second number of customers who purchased items in the second product type within the certain time period after purchasing items in the first product type; and computing the retention probability based on a ratio between the second number and the first number.

In some embodiments, the retention probability for a given product type is the same for all customers. In some embodiments, a retention in the meaning of the retention probability for a customer means the customer will buy another product within a predetermined time period, e.g. the next 8 weeks.

In some embodiments, the certain time period is predetermined based on an analysis of customer churn data of the retailer. In some examples, a propensity to churn increases dramatically if no purchases are made within the first N weeks after customers' first interaction or purchase with the retailer. In this case, the certain time period is equal to N weeks, and the retailer desires to activate and keep these customers by recommending appealing items during the N weeks to the customers to increase customer retention. In some examples, a big percentage of existing customers make a repeat purchase within M weeks, while a small percentage of new and reactivated customers do the same within M weeks. In this case, the certain time period is equal to M weeks, and the retailer desires to activate and keep these customers by recommending appealing items during the M weeks to the customers to increase customer retention.

As such, the system can target right customer cohorts at contextual touchpoints during a predetermined activation window. In addition, the system can target some categories or product types where new and reactivated customer cohorts are organically making repeat transaction within the certain time period. The system can also optimize the post transaction journey to better facilitate this repeat behavior, e.g. by recommending appealing items that can increase customer retention and/or trigger additional transactions.

In some embodiments, the item ranking engine 408 can obtain data related to the recommendation request (including data about the anchor item, the customer and the plurality of candidate items) from the personalization unified service engine 402, the relevance computing engine 404, the retention computing engine 406 and/or the database 116. In some embodiments, the item ranking engine 408 obtains the relevance scores from the relevance computing engine 404, and obtains the retention scores from the retention computing engine 406. In some embodiments, the item ranking engine 408 obtains the item ranking model 396 from the database 116, where the item ranking model 396 includes one or more models for generating a ranked list of recommended items based on the plurality of candidate items, the relevance scores and the retention scores.

In some embodiments, the item ranking engine 408 may first rank the plurality of candidate items based on their respective relevance scores regarding the anchor item to generate a ranked list of relevant items. Then, the item ranking engine 408 can re-rank, using at least one machine learning model, the ranked list of relevant items to generate a re-ranked list of relevant items based on a weighted combination of the relevance scores and the retention scores, with corresponding weights predetermined during a training stage of the at least one machine learning model. The at least one machine learning model may be part of the item ranking model 396. In some examples, the item ranking engine 408 may select a plurality of top ranked items in the re-ranked list of relevant items to generate the ranked list of recommended items. The number of the selected items in the ranked list of recommended items may be determined based on: a size of the user interface associated with the customer, a type of webpage in which the recommended items will be displayed, etc.

In some embodiments, the at least one machine learning model is trained during the training stage based on: generating training data based on historical transaction data and historical user session data of a plurality of customers; and training the at least one machine learning model using the training data to optimize hyperparameters of the at least one machine learning model. In some embodiments, the training data is stored as the model training data 398 in the database 116. In some embodiments, the optimized hyperparameters include a first weight for the relevance scores and a second weight for the retention scores. For example, to determine a rank for a candidate item, the item ranking engine 408 can compute a weighted summation of the relevance score (between the anchor item and the candidate item) with the first weight and the retention score (between the anchor item and the candidate item) with the second weight. The weighted summation for the candidate item is compared with weighted summations similarly computed for other candidate items to determine the rank of the candidate item. In some embodiments, the training process may be performed by one or more of the relevance computing engine 404, the retention computing engine 406 and the item ranking engine 408 in the item recommendation computing device 102.

In some embodiments, the training data includes a plurality of item pairs each including an anchor sample and a recommendation sample and associated with a label score.

The label score may be determined based on interaction data of the plurality of customers regarding the recommendation sample.

In some embodiments, the at least one machine learning model is trained to optimize an objective function based on the optimized hyperparameters. The objective function is computed based on a plurality of ranking differences each being a difference between a first ranking and a second ranking for a respective anchor sample. Each of the first ranking and the second ranking is a ranking of the recommendation samples paired to the respective anchor sample. The first ranking of the recommendation samples is determined based on the at least one machine learning model being trained. The second ranking of the recommendation samples is determined based on their respective label scores.

In some embodiments, the label score for each respective item pair is determined based on a combination of interaction scores representing different types of interactions of the plurality of customers regarding a corresponding recommendation sample in the respective item pair. In some embodiments, the interaction scores include at least: a first interaction score representing an add-to-cart operation of a first customer regarding the corresponding recommendation sample, a second interaction score representing a click operation of a second customer regarding the corresponding recommendation sample, and a third interaction score representing an impression operation of a third customer regarding the corresponding recommendation sample. In some examples, the first interaction score is larger than the second interaction score; and the second interaction score is larger than the third interaction score.

In some embodiments, the system splits training data into training groups and test groups. For each training group, input features of every element are compared with every other element in the group. The input features may include relevance scores and retention scores. Each element may correspond to a vector for an item in the recommendation set. Each element has an associated label. For example, an element is labeled one if the corresponding item has been interacted, and labeled zero if the corresponding item has not been interacted.

In some embodiments, if the labels of two elements are different, the system performs vector subtraction to generate a new vector, and add this new vector to a feature list. The system also stores the sign (+1, −1) of this resulting vector in a label list. The feature list includes vectors representing transformed features or feature differences between two items having different labels. The label list includes positive labels (+1) when an interactive item is placed on top of a non-interactive item, and negative labels (−1) when the interactive item is placed below the non-interactive item.

In some embodiments, treating the list of labels as a target, the system solves a binary classification problem with label (+1, −1), by fitting a linear model to the transformed features and labels. This fitting is trying to understand the positioning of the interactive items and non-interactive items, and provide coefficients to generate those positions corresponding to the labels. Using the coefficients from the fit linear model, the system can perform a dot product with the features of the test groups to get a new score. For input features including relevance scores and retention scores, the coefficients include weights for the relevance scores and the retention scores. The new score for each item can be computed as a weighted combination of a relevance score and a retention score with corresponding weights. This new score can be used to rank recommended items for each group.

The trained model can be evaluated by comparing this ranking with a ranking achieved using relevance score for each group. The trained model will place recommended items having a higher chance of being interacted or engaged to a higher rank compared to the ranking achieved merely using relevance score.

In some embodiments, the training of the above mentioned models is performed periodically based on updated training data from updated transaction and user session data. As such, the weights for relevance score and retention score may be updated from time to time.

As such, the item ranking engine 408 may generate the recommendation data 312 as the ranked list of recommended items, and generate data that identifies the order of the recommended items associated with the particular user to optimize user interactions with and user purchases of items in the recommendations. The personalization unified service engine 402 may receive the recommendation data 312 from the item ranking engine 408 in a data format (e.g., message) acceptable by server 104. The personalization unified service engine 402 transmits the recommendation data 312 to server 104. The server 104 may then update or generate item recommendations for presentation to the user via the user device 112 based on the recommendation data 312. For example, the item recommendations may be displayed together with the anchor item on the user interface.

In some embodiments, the user interface is associated with a website or an app of a retailer. In some embodiments, the customer is a new customer who has never made any transaction with the retailer, or a reactivated customer who has not made any transaction with the retailer during a past time period. In some embodiments, the disclosed systems and methods can be applied to any type of customer.

Figure 5:
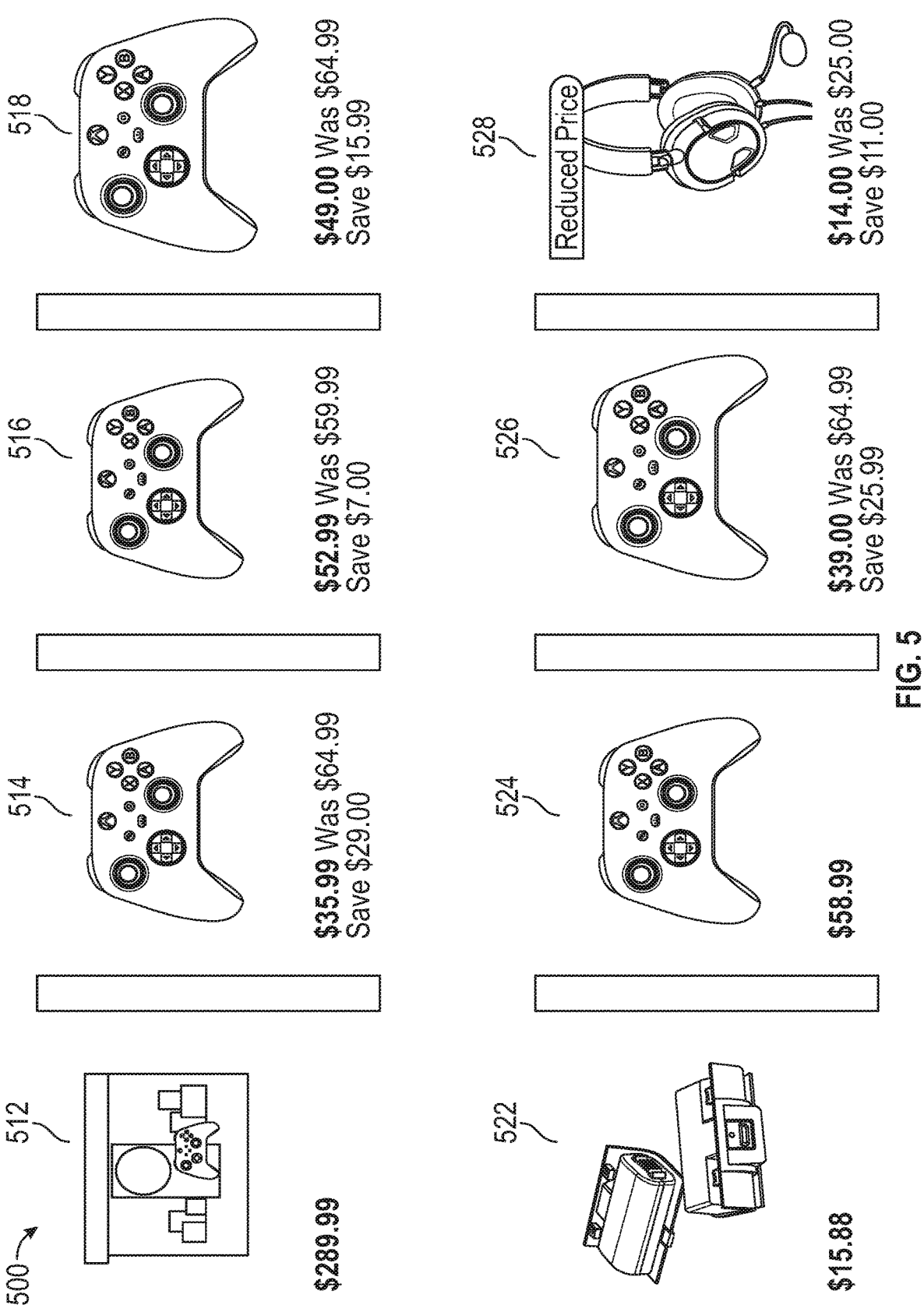
FIG. 5 illustrates an exemplary list of recommended items based on relevance scores, in accordance with some embodiments of the present teaching.
Figure 6:
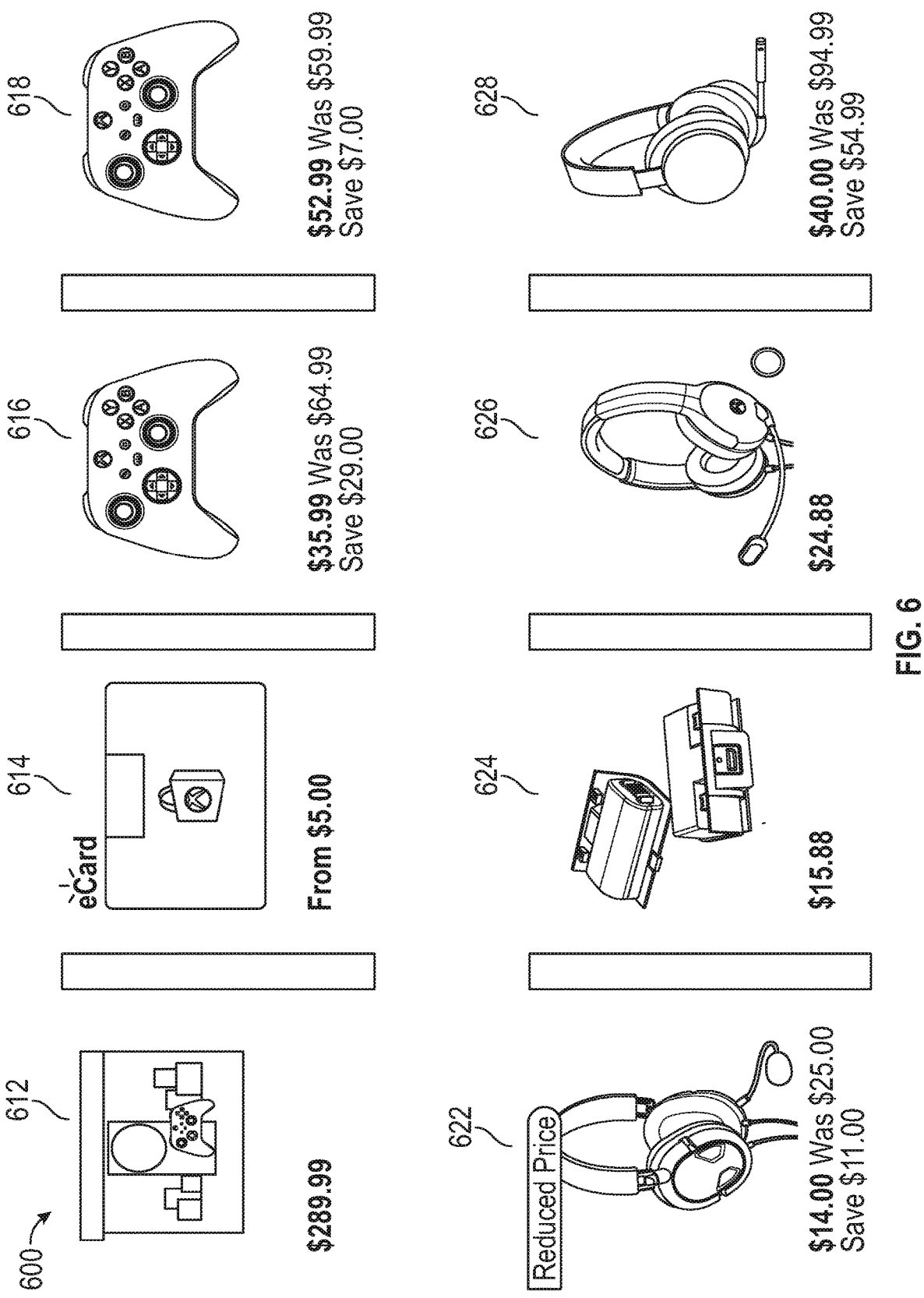
FIG. 6 illustrates an exemplary list of recommended items based on both relevance scores and retention scores, in accordance with some embodiments of the present teaching.

FIG. 5 illustrates an exemplary list 500 of recommended items based on relevance scores, in accordance with some embodiments of the present teaching. As shown in FIG. 5, the exemplary list 500 includes a first carousel of items 512, 514, 516, 518, and a second carousel of items 522, 524, 526, 528. FIG. 6 illustrates an exemplary list 600 of recommended items based on both relevance scores and retention scores, in accordance with some embodiments of the present teaching. As shown in FIG. 6, the exemplary list 600 includes a third carousel of items 612, 614, 616, 618, and a fourth carousel of items 622, 624, 626, 628.

In the example shown in FIG. 5 and FIG. 6, an anchor item may be a wireless gaming controller interacted by a customer. Comparing the list 500 in FIG. 5 with the list 600 in FIG. 6, the list 600 includes a gaming gift card 614 which is not included in the list 500. In this example, although the gaming gift card 614 may not be a similar item or a complementary item to the wireless gaming controller (the anchor item in this example), the gaming gift card 614 is determined by the system to have a high retention score to attract the customer to perform additional transactions on the website or app. As such, the gaming gift card 614 is ranked high in the list 600, although not in the list 500. This may be because many customers came back to buy a gift card in a product type after purchasing an item in the same product type.

In addition, the headset 528 in the list 500 is the same as the headset 622 in the list 600. The headset 622 is ranked higher in the list 600 than the headset 528 in the list 500. This is because: after considering the retention score in addition to the relevance score, the system determines that the headset 622 can increase the customer retention if being placed at a higher rank. This may be because many customers came back to buy an item with reduced price in a product type after purchasing an item in the same product type.

FIG. 7 is a flowchart illustrating an exemplary method 700 for providing item recommendations to increase retention rates of customers, in accordance with some embodiments of the present teaching. In some embodiments, the method 700 can be carried out by one or more computing devices, such as the item recommendation computing device 102 and/or the cloud-based engine 121 of FIG. 1. Beginning at operation 702, a recommendation request for recommending items to a customer is received from a computing device. At operation 704, an anchor item to be displayed to the customer via a user interface is determined based on the recommendation request. At operation 706, relevance scores are determined between the anchor item and a plurality of candidate items. At operation 708, retention scores are determined between the anchor item and the plurality of candidate items. At operation 710, a ranked list of recommended items is generated using at least one machine learning model, based on the plurality of candidate items, the relevance scores and the retention scores. At operation 712, the ranked list of recommended items is transmitted to the computing device, to be displayed to the customer with the anchor item on the user interface.

Although the methods described above are with reference to the illustrated flowcharts, it will be appreciated that many other ways of performing the acts associated with the methods can be used. For example, the order of some operations may be changed, and some of the operations described may be optional.

The methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:

a processor; and a non-transitory memory storing instructions that, when executed, cause the processor to:

generate training data based on historical transaction data and historical user session data of a plurality of users, train at least one machine learning model during a training stage using the training data to optimize hyperparameters of the at least one machine learning model, receive, from a computing device, a recommendation request for recommending items to a user, determine, based on the recommendation request, an anchor item to be displayed to the user via a user interface, determine relevance scores between the anchor item and a plurality of candidate items, determine retention scores between the anchor item and the plurality of candidate items, generate, using the at least one machine learning model, a ranked list of recommended items based at least by:

ranking the plurality of candidate items based on their respective relevance scores regarding the anchor item to generate a first ranking list of relevant items, for each relevant item in the first ranking list, generating a weighted combination of a relevance score and a retention score regarding the anchor item using the at least one machine learning model based on a first weight for the relevance score and a second weight for the retention score, wherein the optimized hyperparameters of the at least one machine learning model include at least the first weight for the relevance score and the second weight for the retention score, re-ranking the first ranking list to generate a second ranking list of relevant items based on the weighted combinations for the relevant items, and selecting a plurality of top items in the second ranking list to generate the ranked list of recommended items, and transmit to the computing device the ranked list of recommended items to be displayed to the customer user with the anchor item on the user interface.

2. The system of claim 1, wherein:

the user interface is associated with a website or an app of a retailer; and the user is a new user who has never made any transaction with the retailer, or a reactivated user who has not made any transaction with the retailer during a past time period.

3. The system of claim 1, wherein the relevance scores are determined based on:

for each candidate item of the plurality of candidate items:

computing a similarity score between the anchor item and the candidate item;

computing a complementary score between the anchor item and the candidate item; and computing a relevance score between the anchor item and the candidate item based on: the similarity score, the complementary score, or a combination of both.

4. The system of claim 1, wherein the retention scores are determined based on:

for each candidate item of the plurality of candidate items, computing a retention score indicating a probability that the user will purchase the candidate item within a future time period.

5. The system of claim 4, wherein computing the retention score comprises:

determining a first product type of the anchor item;

determining a second product type of the candidate item;

computing, based on a Bayesian statistical model, a retention probability that the user will purchase an item in the second product type within a certain time period after purchasing an item in the first product type; and computing the retention score based on the retention probability.

6. The system of claim 5, wherein computing the retention probability comprises:

determining a first number of users who purchased items in the first product type;

determining, among the first number of users, a second number of users who purchased items in the second product type within the certain time period after purchasing items in the first product type; and computing the retention probability based on a ratio between the second number and the first number.

7. The system of claim 1, wherein:

the training data includes a plurality of item pairs each including an anchor sample and a recommendation sample and associated with a label score;

the label score is determined based on interaction data of the plurality of users regarding the recommendation sample;

the at least one machine learning model is trained to optimize an objective function based on the optimized hyperparameters;

the objective function is computed based on a plurality of ranking differences each being a difference between a first ranking and a second ranking for a respective anchor sample;

each of the first ranking and the second ranking is a ranking of the recommendation samples paired to the respective anchor sample;

the first ranking of the recommendation samples is determined based on the at least one machine learning model; and the second ranking of the recommendation samples is determined based on their respective label scores.

8. The system of claim 7, wherein:

the label score for each respective item pair is determined based on a combination of interaction scores representing different types of interactions of the plurality of users regarding a corresponding recommendation sample in the respective item pair;

the interaction scores include at least: a first interaction score representing an add-to-cart operation of a first user regarding the corresponding recommendation sample, a second interaction score representing a click operation of a second user regarding the corresponding recommendation sample, and a third interaction score representing an impression operation of a third user regarding the corresponding recommendation sample;

the first interaction score is larger than the second inter-
action score; and the second interaction score is larger than the third inter-
action score.

9. A computer-implemented method, comprising:

generating training data based on historical transaction
data and historical user session data of a plurality of
users;

training at least one machine learning model during a
training stage using the training data to optimize hyper-
parameters of the at least one machine learning model;

receiving, from a computing device, a recommendation
request for recommending items to a user;

determining, based on the recommendation request, an
anchor item to be displayed to the user via a user
interface;

determining relevance scores between the anchor item
and a plurality of candidate items;

determining retention scores between the anchor item and
the plurality of candidate items;

generating, using the at least one machine learning model,
a ranked list of recommended items based at least by:

ranking the plurality of candidate items based on their
respective relevance scores regarding the anchor
item to generate a first ranking list of relevant items, for each relevant item in the first ranking list, generat-
ing a weighted combination of a relevance score and
a retention score regarding the anchor item using the
at least one machine learning model based on a first
weight for the relevance score and a second weight
for the retention score, wherein the optimized hyper-
parameters of the at least one machine learning
model include at least the first weight for the rel-
evance score and the second weight for the retention
score, re-ranking the first ranking list to generate a second
ranking list of relevant items based on the weighted
combinations for the relevant items, and selecting a plurality of top items in the second ranking
list to generate the ranked list of recommended
items; and transmitting to the computing device the ranked list of
recommended items to be displayed to the user with the
anchor item on the user interface.

10. The computer-implemented method of claim 9,
wherein determining the relevance scores comprises:

for each candidate item of the plurality of candidate items:

computing a similarity score between the anchor item
and the candidate item;

computing a complementary score between the anchor
item and the candidate item; and computing a relevance score between the anchor item
and the candidate item based on: the similarity score,
the complementary score, or a combination of both.

11. The computer-implemented method of claim 9,
wherein determining the retention scores comprises:

for each candidate item of the plurality of candidate items,
computing a retention score indicating a probability
that the customer user will purchase the candidate item
within a future time period.

12. The computer-implemented method of claim 11,
wherein computing the retention score comprises:

determining a first product type of the anchor item;

determining a second product type of the candidate item;

computing, based on a Bayesian statistical model, a
retention probability that the user will purchase an item in the second product type within a certain time period
after purchasing an item in the first product type; and computing the retention score based on the retention
probability.

13. The computer-implemented method of claim 12,
wherein computing the retention probability comprises:

determining a first number of users who purchased items
in the first product type;

determining, among the first number of users, a second
number of users who purchased items in the second
product type within the certain time period after pur-
chasing items in the first product type; and computing the retention probability based on a ratio
between the second number and the first number.

14. The computer-implemented method of claim 9,
wherein:

the training data includes a plurality of item pairs each
including an anchor sample and a recommendation
sample and associated with a label score;

the label score is determined based on interaction data of
the plurality of users regarding the recommendation
sample;

the at least one machine learning model is trained to
optimize an objective function based on the optimized
hyperparameters;

the objective function is computed based on a plurality of
ranking differences each being a difference between a
first ranking and a second ranking for a respective
anchor sample;

each of the first ranking and the second ranking is a
ranking of the recommendation samples paired to the
respective anchor sample;

the first ranking of the recommendation samples is deter-
mined based on the at least one machine learning
model; and the second ranking of the recommendation samples is
determined based on their respective label scores.

15. The computer-implemented method of claim 14,
wherein:

the label score for each respective item pair is determined
based on a combination of interaction scores represent-
ing different types of interactions of the plurality of
users regarding a corresponding recommendation
sample in the respective item pair;

the interaction scores include at least: a first interaction
score representing an add-to-cart operation of a first
user regarding the corresponding recommendation
sample, a second interaction score representing a click
operation of a second user regarding the corresponding
recommendation sample, and a third interaction score
representing an impression operation of a third user
regarding the corresponding recommendation sample;

the first interaction score is larger than the second inter-
action score; and the second interaction score is larger than the third inter-
action score.

16. A non-transitory computer readable medium having
instructions stored thereon, wherein the instructions, when
executed by at least one processor, cause at least one device
to perform operations comprising:

generating training data based on historical transaction
data and historical user session data of a plurality of
users;

training at least one machine learning model during a
training stage using the training data to optimize hyper-
parameters of the at least one machine learning model;

receiving, from a computing device, a recommendation request for recommending items to a user;

determining, based on the recommendation request, an anchor item to be displayed to the user via a user interface;

determining relevance scores between the anchor item and a plurality of candidate items;

determining retention scores between the anchor item and the plurality of candidate items;

generating, using the at least one machine learning model, a ranked list of recommended items based at least by:

ranking the plurality of candidate items based on their respective relevance scores regarding the anchor item to generate a first ranking list of relevant items, for each relevant item in the first ranking list, generating a weighted combination of a relevance score and a retention score regarding the anchor item using the at least one machine learning model based on a first weight for the relevance score and a second weight for the retention score, wherein the optimized hyperparameters of the at least one machine learning model include at least the first weight for the relevance score and the second weight for the retention score, re-ranking the first ranking list to generate a second ranking list of relevant items based on the weighted combinations for the relevant items, and selecting a plurality of top items in the second ranking list to generate the ranked list of recommended items; and transmitting to the computing device the ranked list of recommended items to be displayed to the user with the anchor item on the user interface.

*　　*　　*　　*　　*